(12) United States Patent
Baggi et al.

(10) Patent No.: US 11,598,493 B2
(45) Date of Patent: Mar. 7, 2023

(54) LIGHT MODULE, METHOD FOR MANUFACTURING A LIGHT MODULE AND REAR VIEW DEVICE

(71) Applicant: MOTHERSON INNOVATIONS COMPANY LIMITED, London (GB)

(72) Inventors: Thomas Baggi, Dammarie les Lys (FR); Wilfried Bonny, Dammarie les Lys (FR); Francis Charlet, Dammarie les Lys (FR)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 17/695,045

(22) Filed: Mar. 15, 2022

(65) Prior Publication Data
US 2022/0305982 A1    Sep. 29, 2022

(30) Foreign Application Priority Data
Mar. 25, 2021 (DE) ...................... 10 2021 107 473.8

(51) Int. Cl.
*F21K 9/238* (2016.01)
*F21K 9/237* (2016.01)
(Continued)

(52) U.S. Cl.
CPC .............. *F21K 9/238* (2016.08); *F21K 9/237* (2016.08); *F21V 17/164* (2013.01); *F21Y 2115/10* (2016.08)

(58) Field of Classification Search
CPC . B60Q 1/22; F21K 9/237; F21K 9/238; F21V 17/164; F21Y 2115/10
See application file for complete search history.

(56) References Cited

U.S. PATENT DOCUMENTS 7,104,676 B2 * 9/2006 Bukosky ............... B60R 1/1207
                                                         362/135
9,434,313 B2 * 9/2016 Minikey, Jr. .............. B60R 1/12
(Continued)

FOREIGN PATENT DOCUMENTS

DE    10 2005 040 437 A1    3/2007
DE    10 2010 061 643 A     7/2012
(Continued)

OTHER PUBLICATIONS

German Office Action dated Nov. 26, 2021 of application DE 10 2021 107 473.8.

*Primary Examiner* — Evan P Dzierzynski
(74) *Attorney, Agent, or Firm* — Jones Day

(57) ABSTRACT

The present disclosure refers to a light module, comprising a lens unit, which is formed with a bottom, a lid and one or more side walls between the bottom and the lid, wherein the one or more side walls provide one or more insertion openings; a printed circuit board unit, which carries one or more light sources and is inserted into the lens unit through a first insertion opening of the one or more insertion openings such that light emitted by the one or more light sources exits the light module through the bottom and/or the lid of the lens unit; and a housing unit, which is provided with a bottom opening, a lid opening and one or more side walls between the bottom opening and the lid opening, wherein the lens unit is arranged within the housing unit such that the bottom opening of the housing unit is closed by the bottom of the lens unit, the lid opening of the housing unit is closed by the lid of the lens unit, and the one or more insertion openings of the lens unit is closed by the one or more side walls of the housing unit. It also refers to an external rear view device with such a light unit.

14 Claims, 3 Drawing Sheets

(51) Int. Cl.
*F21V 17/16* (2006.01)
*F21Y 115/10* (2016.01)

(56) References Cited

U.S. PATENT DOCUMENTS

| | | | | |
|---|---|---|---|---|
| 10,843,630 | B2* | 11/2020 | Little | B60R 1/1207 |
| 2012/0099335 | A1* | 4/2012 | Boehland | B60Q 1/2665 |
| | | | | 362/494 |
| 2017/0136953 | A1* | 5/2017 | Tseng | B60R 1/1207 |
| 2020/0290516 | A1* | 9/2020 | Messenger | B60Q 1/247 |

FOREIGN PATENT DOCUMENTS

| WO | WO 2018/178268 A2 | 10/2018 |
|---|---|---|
| WO | WO 2018/193000 A1 | 10/2018 |

* cited by examiner

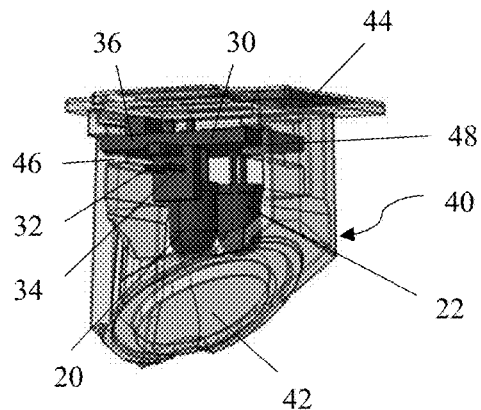
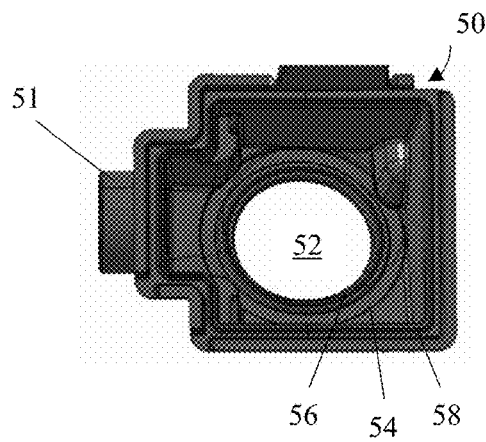
Fig. 1a
Fig. 2
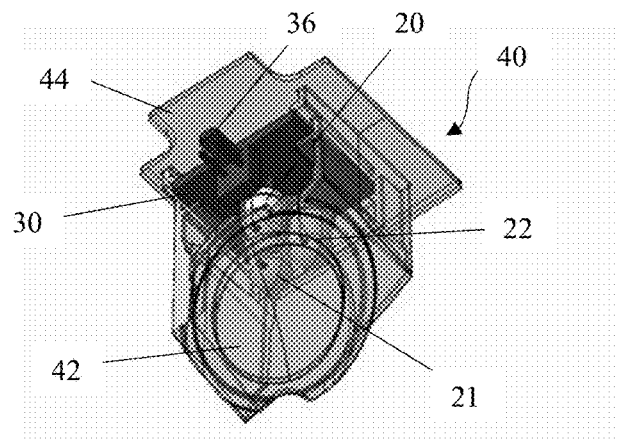
Fig. 1b
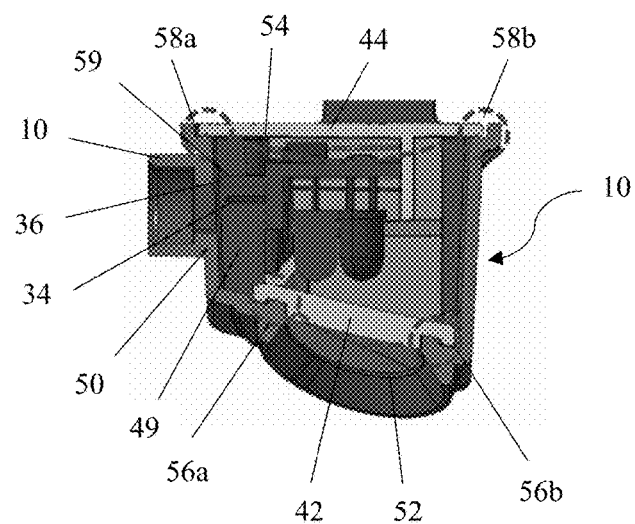
Fig. 3

LIGHT MODULE, METHOD FOR MANUFACTURING A LIGHT MODULE AND REAR VIEW DEVICE

CROSS-REFERENCE TO RELATED APPLICATIONS

This application claims the benefit of priority to German Patent Application No. DE 10 2021 107 473.8, filed on Mar. 24, 2021, which is incorporated herein by reference in its entirety.

BACKGROUND

1. Field

The present disclosure relates to a light module, in particular adapted for an exterior rear view device, and an exterior rear view device for a vehicle with such a light module.

2. Related Art

US 2005/0168922 A1 refers to a light module in form of an optoelectronic component based on the surface mount technology, said component comprising a electrically conductive material, an opaque plastic material, and a cavity, wherein the electrically conductive material serves as a base for the assembly, the opaque plastic material provides a housing for the whole component, and the cavity is located within the plastic material where an optoelectronic chip is mounted in. The known light module provides a solderless LED holder without additional measures for the attachment to a device.

EP 3 138 734 B1 discloses an exterior rear view device light assembly comprising at least one light module for the light assembly and at least one printed circuit board unit, with the light module comprising a light source unit with at least one wire for an electric connection with said printed circuit board unit of the light assembly, with the light source unit comprising a radiation surface and a light source housing, a housing unit supporting the light source unit and being provided with connecting and/or holding means for the attachment to at least one part, in particular a housing part, of the rear view device, and sealing means for water and dustproof of the connection between the light module and the at least one part. The printed circuit board unit is remote from the light module and the wire(s) of the light module is/are soldered to the printed circuit board unit providing a soldering pad pattern. The sealing means forms the perimeter of the housing unit in the region supporting the light source unit, and the housing unit is formed together with the light source housing and the sealing means by 2-K injection molding.

SUMMARY

It is an object of the present disclosure to provide a light assembly that is not only is compact and easy to mount, but also easy to manufacture and at least whether proof, preferably water proof.

This object may be achieved by a light module, comprising a lens unit, which is formed with a bottom, a lid and one or more side walls between the bottom and the lid, wherein the one or more side walls provide one or more insertion openings; a printed circuit board unit, which carries one or more light sources and is inserted into the lens unit through a first insertion opening of the one or more insertion openings such that light emitted by the one or more light sources exits the light module through the bottom and/or the lid of the lens unit; and a housing unit, which is provided with a bottom opening, a lid opening and one or more side walls between the bottom opening and the lid opening, wherein the lens unit is arranged within the housing unit such that the bottom opening of the housing unit is closed by the bottom of the lens unit, the lid opening of the housing unit is closed by the lid of the lens unit, and the one or more insertion openings of the lens unit is closed by the one or more side walls of the housing unit.

It is proposed that the printed circuit board unit is supported by the lens unit, wherein preferably two opposite edges of the printed circuit board unit are arranged on or in two guide rails provided by the lens unit, in particular by two opposite side walls of the lens unit.

Embodiments can be further specified in that the printed circuit board unit provides one or more connector pins and/or at least one extension, wherein preferably the one or more connector pins extend into a second insertion opening of the one or more insertion openings of the lens unit and/or the at least one extension extends into a third insertion opening of the one or more insertion openings of the lens unit, with in particular the second and/or third insertion opening being provided by the first insertion opening.

Further, embodiments can be characterized in that the housing unit is provided with at least one stop and/or alignment feature for the lens unit and/or the printed circuit board unit, wherein preferably the housing unit provides a first step-like extension around its bottom opening for locating the bottom of the lens unit and/or a second step-like extension around its lid opening for locating the lid of the lens unit and/or an internal step on the internal surface of the side wall closing the first insertion opening of the lens unit for locating the at least one extension of the printed circuit board unit.

With the present disclosure it is also proposed that a first welding track is provided between the housing unit and the lens unit, preferably around the bottom opening of the housing unit, in particular defined by a spike running parallel to the first step-like extension, and/or a second welding track is provided between the housing unit and the lens unit, preferably around the lid opening of the housing unit, in particular defined by a spike running along the second step-like extension.

The first and second welding tracks may be simultaneously conducted.

It is proposed that at least one connector extension is provided by the housing unit for inserting a connector for connecting the printed circuit board unit, wherein preferably the at least one connector extension is provided by the side wall closing the one or more insertion openings of the lens unit, in particular formed on the external surface of the side wall in the region of the internal step, and/or wherein preferably an isolating rack is extending in the at least one connector extension, in particular between two connector pins of the one or more connector pins of the printed circuit board unit.

In addition, the one or more light sources may comprise at least two, preferably three, light source units, wherein preferably each light source units comprises an LED unit.

The lens unit may be formed of a clear and/or transparent plastic material, and/or the housing unit may be formed of an opaque and/or non-transparent plastic material.

It is further proposed that the housing unit is provided, in particular formed, with an attachment portion, wherein preferably the attachment portion is adapted to mount the light unit via a clip, snap and/or latch connection to a rear view device, and/or wherein preferably the attachment portion is provided with an attachment extension, and/or wherein preferably the attachment portion has a T-shaped cross-section.

The present disclosure also provides an external rear view device with at least one rear view element arranged in a head assembly and at least on light unit of the present disclosure for providing a side turn indicator, a blind spot detection, a logo lamp, a door handle light and/or an approach light.

It is also proposed that the radiation surface of the light module, preferably provided by the bottom of the lens unit, flushes with an exterior surface of the external rear view device.

Embodiments of the external rear view device of the present disclosure may further comprise a base assembly for attachment to a vehicle, wherein the head assembly is moveable relative to the base assembly.

It is also proposed that at least one first light module is attached to the head assembly, in particular a head frame, and/or at least one second light module is attached to the base assembly, wherein preferably the attachment portion of the light module is providing a releasable clip, snap and/or latch connection.

Finally, it is proposed that a connector is entered into each connector extension of the light module for sealing the same.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 1a is a perspective view of a lens unit of a light module of the present disclosure;

FIG. 1b is a further perspective view of the lens unit of FIG. 1a;

FIG. 2 is a top view on a housing unit of the light module of the present invention;

FIG. 3 is a longitudinal cross-section of the light module of the present invention;

FIG. 6b is a cross-section taken along the line B-B of FIG. 6a;

DETAILED DESCRIPTION

Figure 4:
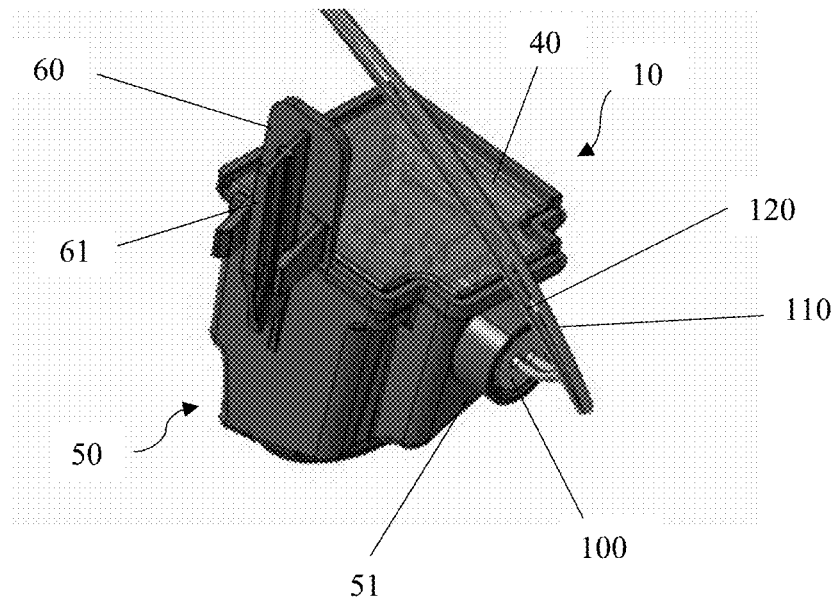
FIG. 4 is a perspective view of the light module of FIG. 3, with a connector.

A light module 10 of the present disclosure is shown in FIG. 3 as well as 4. Thus, the light module 10 comprises a non-transparent plastic housing unit 50 shown in FIG. 2 and a lens unit 40 made out of a crystal clear material, in particular plastic, accommodating a printed circuit board unit 30 carrying three LED units 20, 21, 22, as shown in FIGS. 1a and 1b. Thus, FIG. 3 shows the lens unit 40 of FIGS. 1a and 1b arranged within the housing unit 50 of FIG. 2.

The lens unit 40 comprises a bottom 42 acting as a light window for light emitted by one or both of the LED units 20, 21, 22. Opposite said bottom 42 there is a lid 44, between the bottom 42 and the lid 44 there is at least one side wall and below the lid 44, the printed circuit board unit 30 with the LED units 20, 21, 22 is inserted by entering opposite edges of the printed circuit board unit 30 into two guide rails 46, 48 provided by the lens unit 40. For allowing such an insertion of the printed circuit board unit 30 with the LED units 20, 21, 22 into the lens unit 40, the lens unit 40 is provided with at least one insertion opening 49 between its bottom 42 and lid 44 and, thus, provided by the at least one side wall, as best seen in FIG. 3. For example, the lens unit 40 may be formed with 5 three side walls between the bottom 42 and the lid 44.

The housing unit 50 is formed with a connector extension 51 which will be explained below. In addition, said housing unit 50 is formed with a bottom opening 52, a lid opening 54 and at least one side wall there between. Both of these openings 52, 54 are closed as soon as the lens unit 40 is inserted into the housing unit 50. In detail, the bottom 42 of the lens unit 40 closes the bottom opening 52 of the house unit 50, whereas the lid 44 of the lens unit 40 closes the lid opening 54 of the housing unit 50 as shown in FIG. 3. Still further, the insertion opening 49 of the lens unit 40 is closed by the housing unit 50, for example by the side wall of the housing unit 50 provided with the connector extension 51.

In order to provide a sealed light module 10, the lens unit 40 and the housing unit 50 are connected to each other by two separate welding tracks, as indicated in FIG. 2 by the two welding tracks 56, 58 and in FIG. 3 by the welding regions 56a, 56b, 58a and 58b. Thus, no additional O-ring seal is needed.

Figure 5:
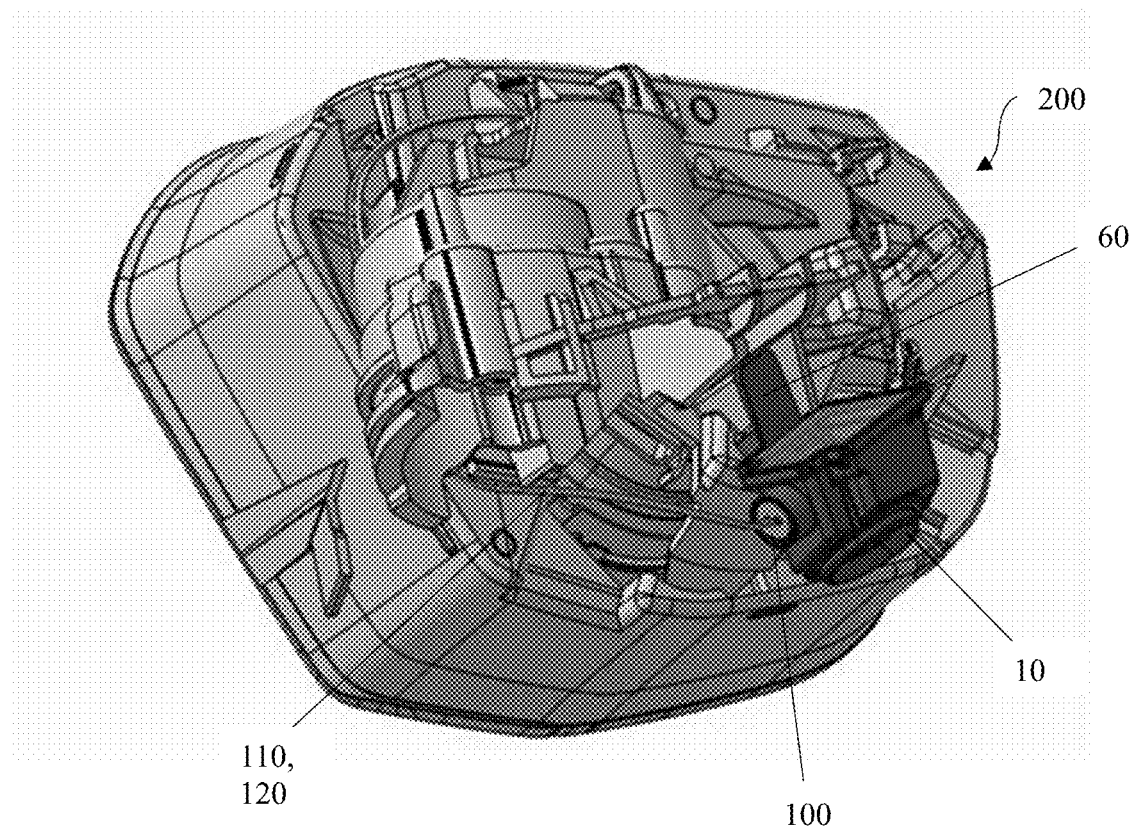
FIG. 5 is a perspective view of the light module of FIG. 4, mounted to a head frame of a rear view device.

In addition, a sealed connector 100 may be inserted into the connector extension 51 as shown in FIG. 4 when mounting the light module 10 to a rear view device, in particular a head frame 200 thereof, as shown in FIG. 5. The connector 100 not only serves an electrical connection of two connector pins 32, 34 extending from the printed circuit board unit 30 and, thus, the printed circuit board unit 30 with a control unit and/or power source (not shown), via cables 110, 120, but also provides the final sealing of the light module 10 such that all housing apertures are closed. In fact, the connector 100 closes both, the opening of the housing unit 50 in region of the connector extension 51 as well as the insertion opening 49 in the region of the two connector pins 32, 34.

In addition to the two connector pins 32, 34, the printed circuit board unit 30 is provided with an attachment extension 36, see FIGS. 1a, 1b and 3. Said attachment extension 36 as well as the two connector pins 32, 34 extend in the direction of the insertion opening 49, and the attachment extension 36 engages an internal step 59 of the housing unit 50 extending into the interior of the housing unit 50. Thus, the attachment extension 36 and the step 59 ensure the correct location of the sub-assembly of the lens unit 40 together with the printed circuit board unit 30 carrying the LED units 20, 21, 22 in the housing unit 50.

The housing 50 is also provided with an attachment portion 60, best seen in FIGS. 4 and 5. The attachment portion is provided with an attachments extension 61 such that its cross-section is substantially T-shaped. The attachment portion 60 is suited for a clip connection of the light module 10 to the head frame 200.

The details of the sealing provided by the two separate welding tracks 56, 58 with the welding region 56a, 56b, 58a, 58b is further illustrated with respect to FIGS. 6a to 6d.

Figure 6A:
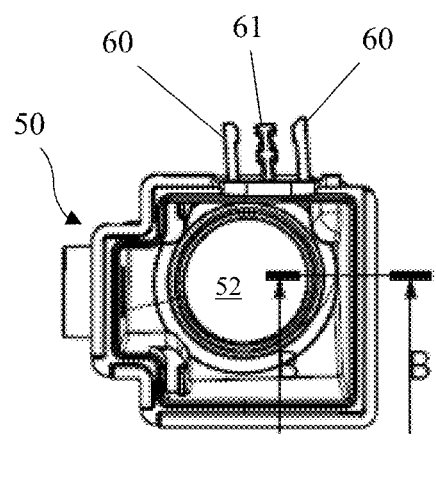
FIG. 6a is a transversal cross-section of the housing unit of FIG. 2.
Figure 6D:
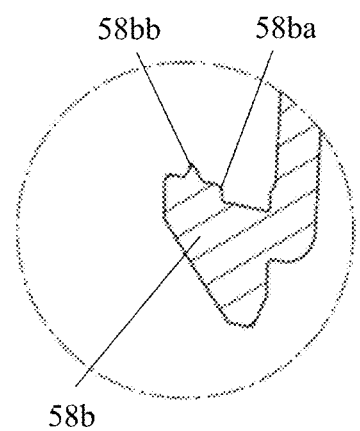
FIG. 6d is an enlarged view of the upper end of FIG. 6b.
Figure 6B:
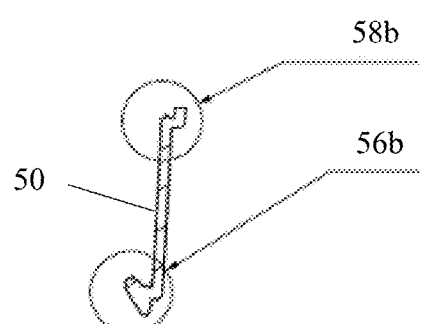
Figure 6C:
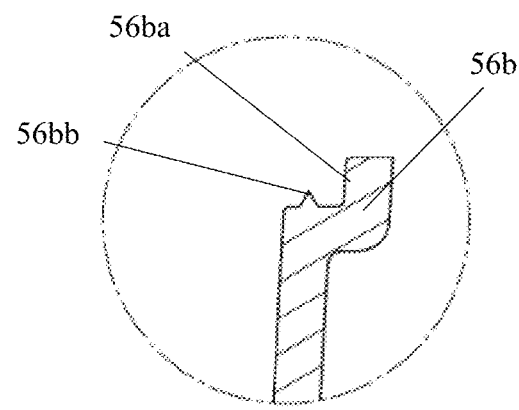
FIG. 6c is an enlarged detail view of the lower end in FIG. 6b.

FIG. 6a shows a transversal cross-section of the housing unit 50, and FIG. 6b shows the cross-section taken along the line B-B of FIG. 6a, which goes through both of the welding tracks 54, 58. Details of the bottom welding track region 56b are shown in FIG. 6d, and details of the top welding track region 56b in FIG. 6c.

Accordingly, the edges provided around the openings 52 and 54 of the housing unit 50 are formed to support the bottom 42 and the lid 44 of the lens unit 40, respectively, and facilitate the welding for a sealing the unit 10. For that purpose, step-like extensions 56ba and 58ba are provided to embrace an edge of the bottom 42 and the lid 44, respectively. In addition spikes 56bb and 58bb providing the welding tracks 56, 58 by either running parallel to the respective step-like extension 56ba or on the step-like extension 58ba can be seen in FIGS. 6d and 6c.

The final light unit 10, as soon as mounted in the rear view device and connected with the connector 100 inserted into the connector extension 51, is a sealed module with the clear lens 40 letting the LED light going through the lens bottom 42 and the bottom opening 54 of the housing unit 50 respecting EC 48 regulation.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS

10 light module
20 LED unit
21 LED unit
22 LED unit
30 printed circuit board unit
32 connector pin
34 connector pin
36 extension
40 lens unit
42 bottom
44 lid
46 guide rail
48 guide rail
49 insertion opening
50 housing unit
51 connector extension
52 bottom opening
54 lid opening
56 weld track
56a, 56b welding region
56ba step-like extension
56bb spike
58 weld track
58a, 58b welding region
58ba step-like extension
58bb spike
59 internal step
60 attachment element
61 attachment extension
100 connector
110 cable
110 cable
200 head frame

The invention claimed is:

1. A light unit, comprising
   a lens unit, which is formed with a bottom, a lid and one or more side walls between the bottom and the lid, wherein the one or more side walls provide one or more insertion openings;
   a printed circuit board unit, which carries one or more light sources and is inserted into the lens unit through a first insertion opening of the one or more insertion openings such that light emitted by the one or more light sources exits the light module through the bottom and/or the lid of the lens unit; and
   a housing unit, which is provided with a bottom opening, a lid opening and one or more side walls between the bottom opening and the lid opening, wherein the lens unit is arranged within the housing unit such that the bottom opening of the housing unit is closed by the bottom of the lens unit, the lid opening of the housing unit is closed by the lid of the lens unit, and the one or more insertion openings of the lens unit is closed by the one or more side walls of the housing unit.

2. The light unit of claim 1, wherein
   the printed circuit board unit is supported by the lens unit, and
   two opposite edges of the printed circuit board unit are arranged on or in two guide rails provided by two opposite side walls of the lens unit.

3. The light unit of claim 1, wherein
   the printed circuit board unit provides one or more connector pins and at least one extension, and
   the one or more connector pins extend into a second insertion opening of the one or more insertion openings of the lens unit and the at least one extension extends into a third insertion opening of the one or more insertion openings of the lens unit, with the second and third insertion opening being provided by the first insertion opening.

4. The light unit of claim 1, wherein
   the housing unit is provided with at least one stop and alignment feature for the lens unit and the printed circuit board unit, and
   the housing unit provides a first step-like extension around its bottom opening for locating the bottom of the lens unit and a second step-like extension around its lid opening for locating the lid of the lens unit and an internal step on the internal surface of the side wall closing the first insertion opening of the lens unit for locating the at least one extension of the printed circuit board unit.

5. The light unit of claim 1, wherein
   a first welding track is provided between the housing unit and the lens unit, around the bottom opening of the housing unit, defined by a spike running parallel to the first step-like extension, and
   a second welding track is provided between the housing unit and the lens unit, around the lid opening of the housing unit, defined by a spike running along the second step-like extension.

6. The light unit of claim 1, wherein
   at least one connector extension is provided by the housing unit for inserting a connector for connecting the printed circuit board unit, and the at least one connector extension is provided by the side wall closing the one or more insertion openings of the lens unit, formed on the external surface of the side wall in the region of the internal step, and an isolating rack is extending in the at least one connector extension, between two connector pins of the one or more connector pins of the printed circuit board unit.

7. The light unit of claim 1, wherein the one or more light sources comprise at least two, preferably three, light source units, wherein each light source units comprises an LED unit.

8. The light unit of claim 1, wherein the lens unit is formed of a clear and/or transparent plastic material, and the housing unit is formed of an opaque and/or non-transparent plastic material.

9. The light unit of claim 1, wherein the housing unit is formed with an attachment portion, and the attachment portion is adapted to mount the light unit via a clip, snap and/or latch connection to a rear view device, and the attachment portion is provided with an attachment extension, and the attachment portion has a T-shaped cross-section.

10. An external rear view device with at least one rear view element arranged in a head assembly and at least one light unit for providing a side turn indicator, a blind spot detection, a logo lamp, a door handle light and/or an approach light, the light unit comprising:

a lens unit, which is formed with a bottom, a lid and one or more side walls between the bottom and the lid, wherein the one or more side walls provide one or more insertion openings;

a printed circuit board unit, which carries one or more light sources and is inserted into the lens unit through a first insertion opening of the one or more insertion openings such that light emitted by the one or more light sources exits the light module through the bottom and/or the lid of the lens unit; and a housing unit, which is provided with a bottom opening, a lid opening and one or more side walls between the bottom opening and the lid opening, wherein the lens unit is arranged within the housing unit such that the bottom opening of the housing unit is closed by the bottom of the lens unit, the lid opening of the housing unit is closed by the lid of the lens unit, and the one or more insertion openings of the lens unit is closed by the one or more side walls of the housing unit.

11. The external rear view device of claim 10, wherein the radiation surface of the light module, provided by the bottom of the lens unit, flushes with an exterior surface of the external rear view device.

12. The external rear view device of claim 10, further comprising a base assembly for attachment to a vehicle, wherein the head assembly is moveable relative to the base assembly.

13. The external rear view device of claim 10, wherein at least one first light module is attached to a head frame, at least one second light module is attached to the base assembly, and the attachment portion of the light module is providing a releasable clip, snap and/or latch connection.

14. The external rear view device of claim 10, wherein a connector is entered into each connector extension of the light module for sealing the same.

\* \* \* \* \*